US005332116A

United States Patent [19]

Nutter et al.

[11] Patent Number: 5,332,116

[45] Date of Patent: Jul. 26, 1994

[54] CERAMIC FIBER INSULATION STRUCTURE WITH READILY REPAIRABLE PERIMETER INSULATION

[75] Inventors: William A. Nutter, Stow; William A. Siwierka, Elyria; Alan J. Ruth, Lorain, all of Ohio

[73] Assignee: Eltech Systems Corporation, Boca Raton, Fla.

[21] Appl. No.: 763,698

[22] Filed: Sep. 23, 1991

[51] Int. Cl.[5] .......................... B65D 6/10; B32R 3/10; F27B 14/08

[52] U.S. Cl. .................................... 220/215; 428/138; 432/248; 432/249; 110/336; 110/340

[58] Field of Search ................ 432/248, 249; 110/336, 110/340; 428/138; 220/215

[56] References Cited

U.S. PATENT DOCUMENTS 4,411,621 10/1983 Miller ................................ 432/247
4,429,504 2/1984 Hounsel et al. ...................... 52/506
4,530,441 7/1985 Miller et al. ........................ 220/215
4,549,382 10/1985 Byrd, Jr. .............................. 52/506
4,606,473 8/1986 Miller et al. ........................ 220/215
4,829,734 5/1989 Schraff ................................ 52/404

OTHER PUBLICATIONS

U.S. patent application Ser. No.: 514,449.

*Primary Examiner*—George F. Lesmes
*Assistant Examiner*—Kathryne Shelborne
*Attorney, Agent, or Firm*—John J. Freer

[57] ABSTRACT

An insulation structure such as a cover provides desirable heat insulation for a heated metal container such as a ladle. The insulation structure is assembled in a manner affording ease of subsequent repair in high-wear areas of ceramic fiber insulation. The ceramic fiber insulation is at least partly in bundled form and the bundles are generally positioned so that fiber blankets are oriented in different directions in the structure, yet the fiber is all in snug fit and achieves highly efficient insulation.

18 Claims, 2 Drawing Sheets

CERAMIC FIBER INSULATION STRUCTURE WITH READILY REPAIRABLE PERIMETER INSULATION

BACKGROUND OF THE INVENTION

A variety of insulating structures that contain high temperature resistant ceramic fiber, typically in blanket form, have been found to be useful in the heavy metals industries, such as the steel industry. For example, a cover has been proposed, such as a cover for a ladle, that includes a metal mesh top with ceramic fiber secured under the metal mesh. Thus, in U.S. Pat. No. 4,606,473 there is disclosed a cover for a ladle or the like which has ceramic fiber, typically in blanket form, and made from fiber such as alumina-silica ceramic fiber, with the ceramic fiber being fastened to the metal mesh. The cover can be provided with an outer rigid edge for resting upon an upper surface of a heated vessel such as a ladle. Moreover, legs depending from such an edge can be useful for aligning the cover with the aperture of the vessel.

It would be desirable to assemble a cover structure that can not only have the strength and durability required of such structures for repeated mill use, but which would also provide ease of fiber repair. Nevertheless, such cover, even for rounded sections, should provide an efficient seal for retaining heat in the vessel.

SUMMARY OF THE INVENTION

An insulation structure has now been devised which provides the strength and durability of previous structures, but builds upon such durability as a base to offer, e.g., a cover of particular ease of repair. The present system especially affords efficient sealing for retaining heat, such as within a vessel, and reducing radiant as well as conductive heat loss, for example, from the upper surfaces of a bottle car, teeming ladle, ladle dryer or ladle pre-heater, tundish or ingot mold.

In one aspect, the invention is generally directed to an insulation cover for retaining heat in a heated container, wherein the cover has a frame member sized at least substantially to an aperture of the container and contains ceramic fiber insulation within the frame member, which fiber insulation is secured to a foraminous member of the cover. In this aspect, the innovative improvement comprises a main body of ceramic fiber insulation situated at least generally within the central area of the cover, with a plurality of ceramic fiber insulation bundles situated around the perimeter of the cover, while having a layer of ceramic fiber packing in snug fit between the main body of ceramic fiber and the perimeter insulation bundles.

In another aspect, the invention is directed to a structure of the described type for use other than as a cover. The invention is also directed to insulation systems wherein ceramic fiber blankets are used in position providing a variety of blanket orientations. Other aspects of the invention pertain to methods of constructing, as well as to methods of repairing, insulation structures. The invention is also directed to a ceramic fiber insulation bundle especially adapted for use in the insulation structure.

DESCRIPTION OF THE PREFERRED EMBODIMENTS

Figure 1:
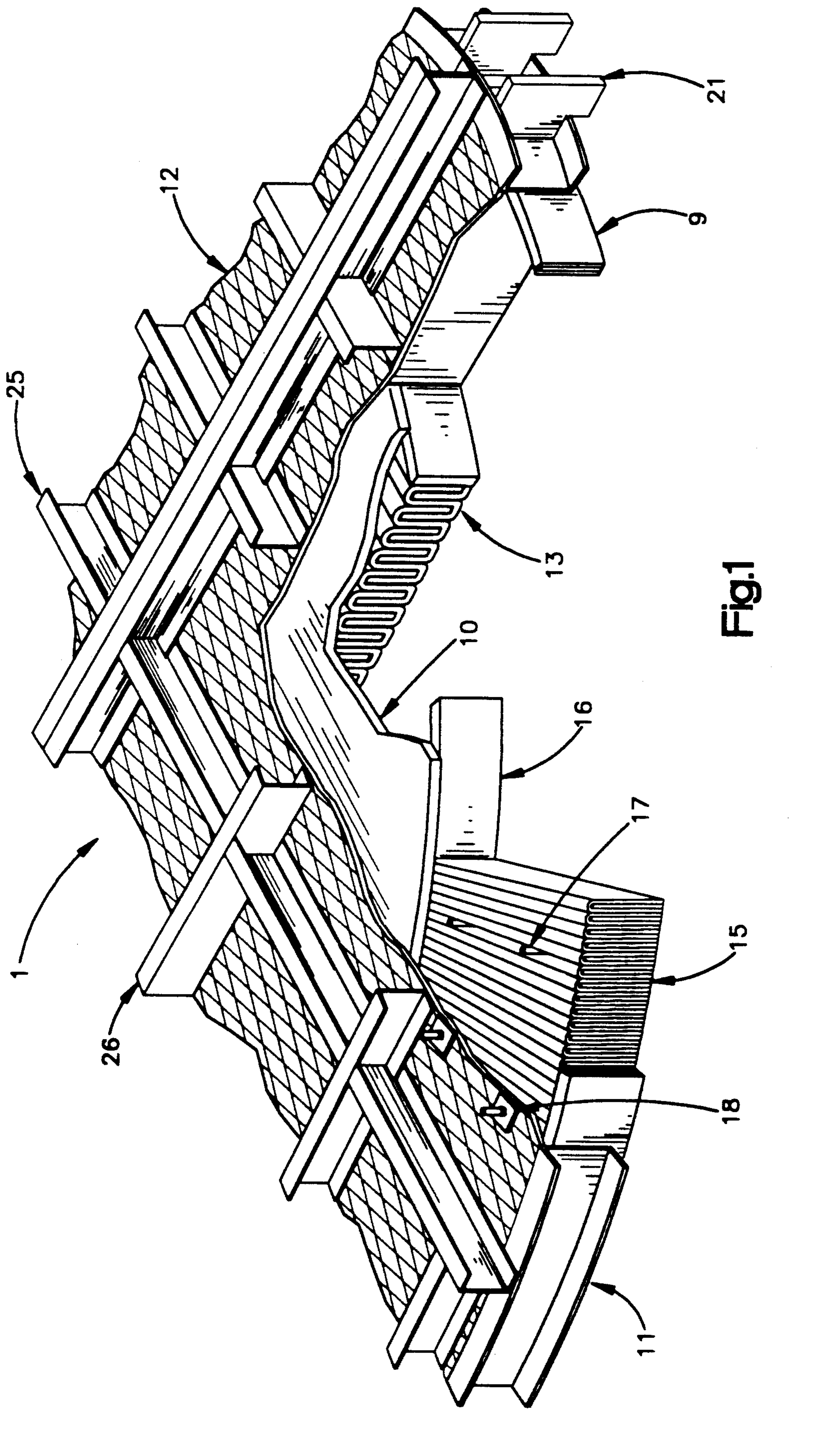
FIG. 1 is a top perspective view of a cover constructed in accordance with the present invention.

It is preferred for economy that the ceramic fiber be a silica-containing fiber, although it is contemplated that such ceramic fiber may not be a silica-containing fiber, as represented by alumina fiber or fiber of boron compound material, e.g., fibers of boron oxide, boron carbide and boron nitride. The silica-containing fiber may simply be silica fiber, although usually the silica is present with one or more of alumina, zirconia, chromia, or titania. Such silica-containing fibers are also meant to include fibers from silicon nitride, silicon carbide, calcium-aluminum silicate and the like. It is to be understood that the fiber will most always be all ceramic fiber. If not all ceramic fiber, the fiber should be at least a major amount ceramic fiber, i.e., greater than 50 weight percent, of ceramic fiber. The minor amount, i.e., under 50 weight percent, balance can be other synthetic or natural mineral fiber, e.g., glass fiber or mineral wool, including mineral wool with additives.

It will be understood that the ceramic fiber may be prepared by any process useful for preparing ceramic fiber. Commercially, such processes include those which fiberize a molten stream, e.g., blowing of a molten stream to fiberize the molten material, or causing the molten stream to impact rapidly spinning wheels which fiberizes the melt. Commercial manufacture also includes sol-gel processing. As the fibers are produced, it will be typical that they will be initially accumulated together into a mat form. Such may be accomplished as by collecting random fibers on a continuous chain-mesh belt apparatus. The accumulated fibers that typically are collected on the mesh belt apparatus can then be needled or stitched together to have a more structured form. For purposes of the present invention, these resulting, structured form fibers, usually when next cut into insulation units, will be referred to herein as being in "mat" form, or as being "blankets" As mats or blankets, these structured insulation units may also be generally referred to herein as "bulk" fiber. The mats or blankets are usually used as strips, either folded or unfolded.

By use of the term ceramic fiber "bundle", reference is being made to a unit of interengaged blankets, which is prepared by binding together a group of blankets. It is also to be understood that the word "wall", or the term "wall-type", as used herein are meant to include any structure, be it a wall, lid, roof or cover, that presents a generally large surface to a heating zone and is useful in some manner in the confining of heat within the zone.

Where the insulation structure of the invention is represented by a cover, the heated metal container for which the cover will find use can be generally any such container wherein usually a large, typically at least substantially planar, cover will be useful. The metal container may be heated by containing hot solid metal, e.g., a steel ingot, or by containing molten metal, such as a ladle into which molten steel or molten aluminum, for example, has been poured. In commercial practice, use of the invention for covering of containers for metals and alloys that melt or are heat treated at such temperatures, is most contemplated. Moreover, the cover will necessarily be most serviceable over containers wherein guide posts can be best employed in aligning the cover over the container. It can be appreciated that the cover is thus most particularly adapted as a lid for a container holding elemental metals or alloys.

It being understood that a cover is particularly representative of a large insulation structure which can embody the invention, reference is now made to the drawing. FIG. 1 depicts a ladle cover 1 having an outer curved frame member 11. Within the frame member 11 is a foraminous metal sheet 12, shown in partial section. Atop the foraminous sheet 12 is a plurality of first stiffeners 25 and, at right angles thereto, a plurality of second stiffeners 26, all of which can be attached, as by welding, to the frame member 11. Just under the foraminous metal sheet 12 there may be a ceramic fiber overlay mat 10. This is usually optional. Guide means 21 depend from the frame member 11 and are used for aligning the cover 1 over a ladle. Just inside the frame member 11, and positioned snugly up against the inner face and in contiguous relationship with frame member 11, there can be placed ceramic fiber perimeter packing blankets 9. These may be blankets in strip form, but they are more usually U-fold blankets and are shown to be of such shape, although other shaped blankets, e.g., S-fold blankets will be serviceable. These are typically very elongate blankets 9 and, as shown in the figure, may be present in several layers, e.g., 2 or 3 layers or more. The use of these outer packing blankets 9 is often optional. When used, these outer packing blankets 9 are in snug relationship with one another, as well as with the inner face of the frame member 11. These outer packing blankets 9 will also be in snug relationship with fiber bundles 15.

Figure 2:
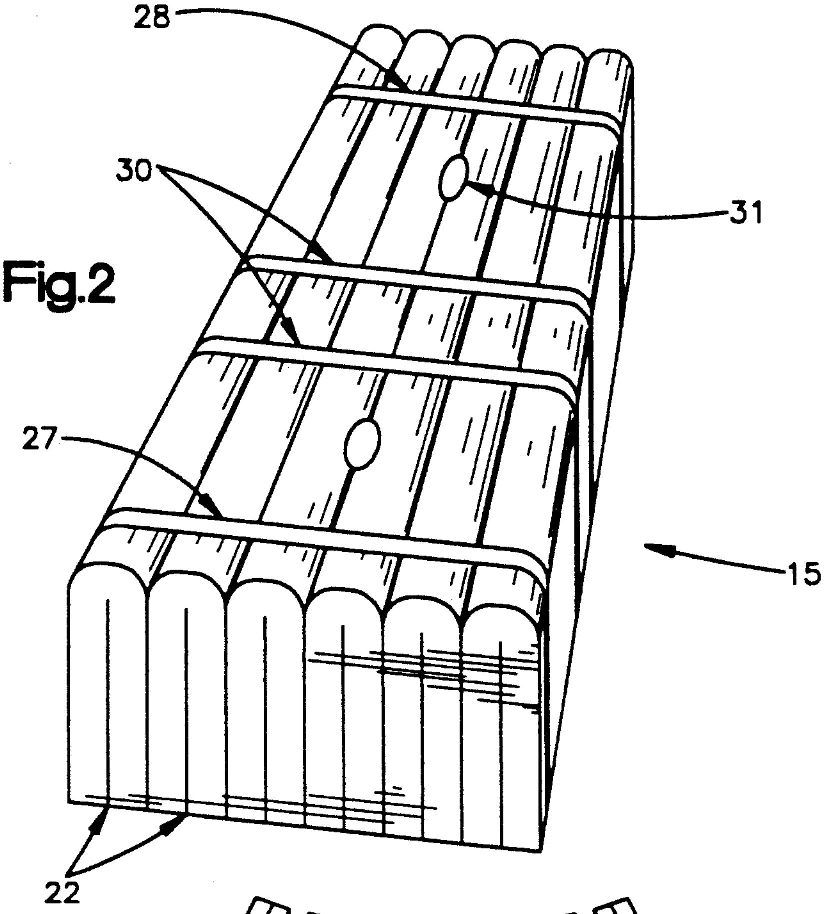
FIG. 2 is a perspective view, from the top, of a fiber bundle especially adapted for use in the cover of FIG. 1.

As shown in the figure, these fiber bundles 15 are bundled from blankets such as individual U-fold or S-fold blankets. The blankets are bundled together in a manner forming a block or bundle (FIG. 2). The bundles 15 when secured to the metal sheet 12 thus affix many blankets at one time to the sheet 12. The bundles 15 are arranged in the cover 1 so that typically the outer ends of the individual blankets face toward the frame member 11. This is the preferred orientation and may be referred to herein as orientation for "circumferential expansion" The individual blankets of these fiber bundles 15 are usually always elongate, i.e., they have little thickness dimension, e.g., on the order of 1 inch to 3 inches, and a much longer length dimension, such as from 12 inches to as much as 24 inches or more. They are however usually not as elongate as the very elongate perimeter packing blankets 9.

In the direction inwardly from the curved frame member 11, the inner ends of the blankets in the fiber bundles 15 abut snugly against inner packing blankets 16. As with the outer packing blankets 9, the inner packing blankets 16 can be blanket strips or various blanket shapes and are usually very elongate blankets 16 which are oriented in concentric relationship with the frame member 11. Also, they may be present in many layers, such as 2 or 3 layers or more. These inner packing blankets 16 are not only in snug relationship with the fiber bundles 15, but also with the main area mats (or blankets) 13. Although it is contemplated that in some occasional instances these inner packing blankets 16 may be dispensed with, it is preferred that they be present to avoid any through joint between the fiber bundles 15 and the main area blankets 13. Packing blankets, not shown, may also be utilized between adjacent fiber bundles 15. These inter-bundle packing blankets, like the outer and inner packing blankets 9, 16 may be blanket strips or various blanket shapes. They also may be present in layers. They usually will not be substantially more elongate than the blankets in the bundle 15, i.e., from about 12 inches to about 24 inches or more. These inter-bundle packing blankets are also optional.

As shown in FIG. 1, the main area blankets 13 generally compose the main body, as well as the central body for the cover, of the ceramic fiber insulation. They may be interlocking S-fold blankets placed side-by-side, as shown in the figure, or of other blanket shape such as generally discussed herein. By "interlocking" as the term is used herein, it is meant that a portion of one blanket is pressed into a fold of an adjacent blanket, in the manner of the interlocking S-fold main area blankets 13 as shown in the figure. Also these blankets 13 are usually very elongate blankets 13, some of which may extend as much as 12 feet or more, i.e., they can be much more elongate than the blankets of the fiber bundles 15. As also noted in the figure, these blankets 13 extend across the cover 1 and are thus often referred to herein as being in transverse orientation. These main area blankets 13, as well as the inner and outer packing blankets 16 and 9, are in "unbundled" form. That is, they are inserted into the cover typically one or two at a time. Where they are affixed to the foraminous metal sheet 12 (packing blankets 16 and 9 may be simply pushed into the structure and held in place by compression) they are affixed as typically individual blankets, usually one blanket at a time, not as prepared units that have structural bundle form with bundle attachment means. All of the fiber insulation, i.e., the fiber bundles 15, the inner packing blankets 16, the blankets 13 of the main area, as well as the optional outer packing blankets 9 and the optional overlay mat 10, are all provided by ceramic fiber insulating material. In combination, this insulation material fills the interior aperture created by the frame member 11. Usually, the folded ceramic fiber blankets will have at least one depending leg section, with U-folded blankets having two, such as shown in the figure. The U-fold leg sections each depend downwardly toward the heated metal container body, not shown.

Fastening means for securing the blankets to the foraminous metal sheet 12 can include any of a variety of such means. As depicted in the figure, the fiber bundles 15 of many blankets may have a few bolts 17 projecting upwardly from the bundles 15 through apertures in the foraminous metal sheet 12. This general structure of only a few fasteners, e.g., the bolts 17, for a bundle of many fiber blankets, is representative of a "bundle attachment means" as such term is used herein. These bolts 17 can then be secured to the foraminous metal sheet 12 by means of nuts (not shown) tightened down over large area washers 18. Within the fiber bundles 15, the bolt 17 may connect with any of a variety of interior bundle support structure (all not shown), e.g., pointed members, to pierce through the blankets. Support rods which may be used for insulation bundles, which rods are positioned in a direction transverse to the layers of blanket in the bundle, i.e., can pierce through the blankets, have been shown for example in U.S. Pat. Nos. 4,429,504 and 4,549,382. Also, support rods can extend along the joint of a U-fold blanket or the like in the manner as shown in U.S. Pat. No. 4,411,621. J-bolts may be secured around these rods to provide the bolts 17 of the bundles 15. Additional securing means that can or have been used, which use has most always been for blankets, include wire ties, such as shown in U.S. Pat. No. 4,411,621. Many means are known in the art for securing ceramic fiber insulation blankets or bundles to a wall-type structure such as provided by a foraminous metal sheet 12, and it is contemplated that all such devices may be useful in the present invention. It also is to be understood that not all of the blankets may be fastened in the same way. For example, the inner and outer packing blankets 3.6, 9 may be wire tied. Likewise the main area blankets 13 can be affixed to the foraminous metal sheet 12 in this manner. The fastening means for the fiber bundles 15 will then preferably be selected on the basis of ease of repair. That is, the securing means should be easy to disassemble to remove used fiber bundles 15 and to easily replace these bundles 15. For this, it is preferred to use a securing means of the bolts, nuts and washers as shown in the figures.

Referring next to FIG. 2, a fiber bundle 15 of generally trapezoidal shape is composed of individual fiber blankets 22. These are shown as U-fold blankets 22 and they are precompressed, i.e., they are held together by compression by a first binding means, or a first band 27, center bands 30, and a second binding mean as, or a second band 28. The second band 28 may or may not be cinched more tightly than the first band 27 for the fiber bundle 15 to take on a trapezoidal shape. For the fiber bundle 15, the distance across the near face (broad part) of the fiber bundle 15, or the width of the bundle, might be on the order of about 12 inches, e.g., from 11 to about 14 inches across, for a bundle of six blankets in U-fold configuration as shown in the figure. Although this is termed the "width" of the bundle 15, it will be understood that it is measured across the thickness dimension (or actually double thickness dimension because of the U-fold form) for the individual blankets. At the back (narrow part), this width for this representative bundle 15 may be on the order of 9 inches across, e.g., from 8 to 11 inches across, with there often being about a 2–4 inch difference in width from the near to the far face. As will be seen in the figure the blankets 22 have a finite, but longer length dimension. Usually the length of the fiber bundle 15, as well as the length of each insulation unit in the bundle, and as measured from the bundle near face to the far face, can be on the order of about 24 inches. As depicted in the figure, these U-fold blankets 22 are interengaged by merely compressing together. However, as for S-fold blankets, these blankets 22 could be interlocked and compressed for interengagement. It is to be understood that at least one blanket may be of different length. For example, a blanket at an edge of the bundle may be longer, e.g., on the order of 34 inches for a 24-inch long bundle. The extra length can be folded, as across the rear face of the bundle, to serve as a packing blanket at the joint formed by the rear face.

The bands 27, 28 can be made of any commercially available strapping material such as plastic banding material, e.g., polyethylene banding. For shipping, a disposable wrap, such as made from cardboard sheets, may be used, as at the sides of the bundle so that the bands 27, 28 and 30 compress against the wrap and not directly against the fiber, particularly at the corners of the bundle 15. When the fiber bundle 15 is inserted in a cover 1, these bands can easily be severed and removed, and any disposable wrap, if present, can also be removed, permitting for expansion of the individual fiber blankets 22. On insertion of the fiber bundle 15 to a cover 1, bolts (not shown) can be inserted through the bundle 15 through tubes 31 and on through the foraminous metal sheet 12 and fastened in the manner such as shown in FIG. 1. The tubes 31 can be removable, disposable tubes 31 which are removed after insertion of the bolts, whereby the fiber blankets 22 can fold around the bolts. A suitable tube, with accompanying tube retainer means has been shown for example in U.S. Pat. No. 5,115,114, the contents of which are incorporated herein by reference. The tube retainer within the block 15 can have side flaps. Pointed rods pushed through the fiber blankets, in the manner as discussed hereinabove in connection with the U.S. Pat. No. 4,549,382, can be inserted through a perforation in the side flaps to maintain the blankets 22 in interengagement in the fiber bundle 15.

Figure 3:
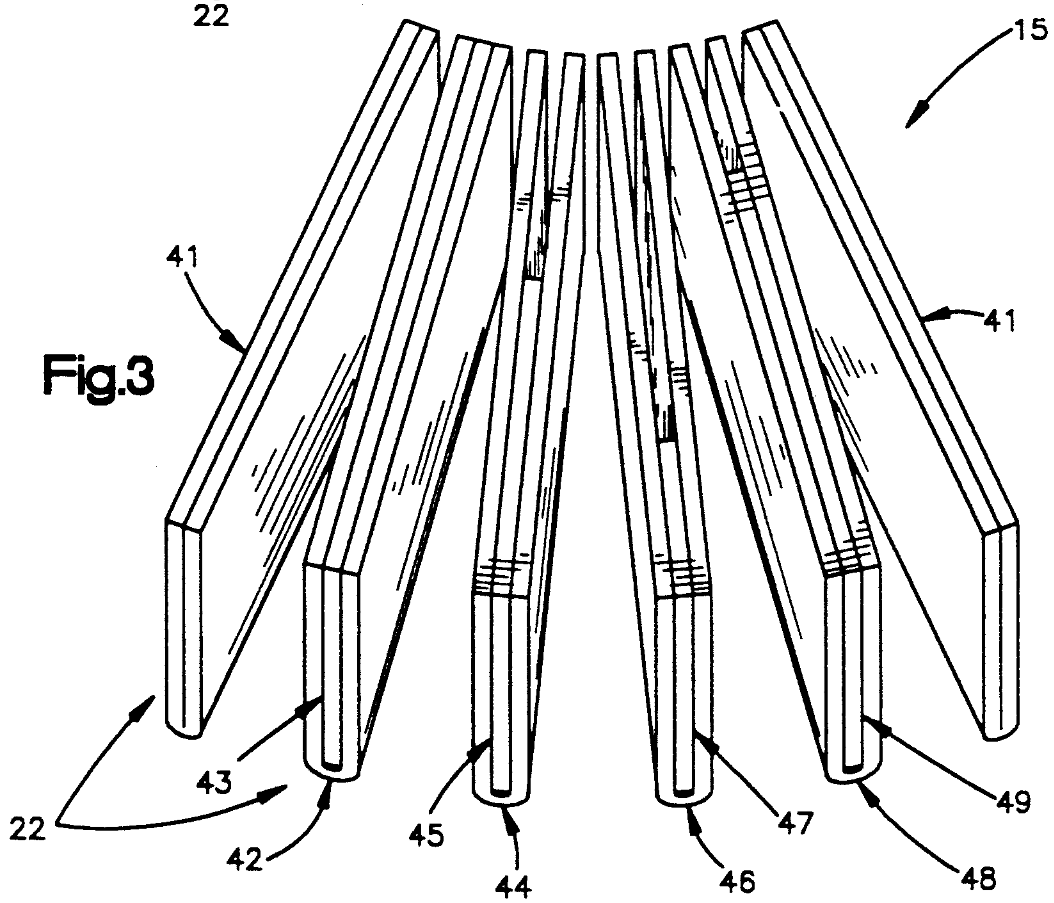
FIG. 3 is a partially exploded, perspective view, from underneath, of a preferred fiber bundle showing only the fiber portion of the bundle.

Referring now to FIG. 3, a fiber bundle 15 is composed of six individual fiber blankets 22. These U-fold blankets 22 are in a bundle 15 such as shown in FIG. 2, but turned upside down and in partially exploded view. As will then be seen from this FIG. 3, this fiber bundle 15 is comprised of U-fold outer fiber blankets 41. These outer fiber blankets 41 are merely U-fold blankets and contain no filler. Next to the left outermost fiber blanket 41 is a fully-filled fiber blanket 42. This blanket 42 is filled with a fiber blanket strip 43 that extends the full length of the fully-filled blanket 42. To the right of this fully-filled blanket 42 is a half-filled blanket 44 containing a blanket strip 45 extending midway, or mid-length, down the full length of the half-filled blanket 44.

Then to the right of the half-filled blanket 44 is a partially-filled blanket 46 which has only a very partial blanket strip 47, i.e., a strip that extends to less than mid-length. Adjacent to the right of this partially-filled blanket 46 is an essentially-filled blanket 48 which contains a filling strip 49 that falls short, but extends essentially the length of the essentially-filled blanket 48. That is, the filling strip 49 extends to greater than mid-length. It will be understood that in compression, the far end of the fiber bundle 15 of FIG. 3 can be readily compressed to a narrower width dimension than, under the same compression, the near end of the fiber bundle 15. In this manner, a trapezoidal-shaped bundle is conveniently manufactured.

In this preferred fiber bundle 15 of FIG. 3, the strip 45 extending to approximately the midpoint of the half-filled blanket 44 will most always be at the midpoint, but it is understood that it may extend from about 40 percent to about 60 percent of the length of the half-filled blanket 44. Similarly, the partially-filled blanket 46 can have a partial strip 47 extending about one quarter of the full length of the partially-filled blanket 46. However, an extension of from about 20 percent to about 30 percent will also be serviceable. Then for the essentially-filled blanket 48, whereas the filling strip 49 will most typically extend about 75 percent of the length of the blanket 48, a filling strip 49 extending from about 70 percent to about 80 percent would be suitable. These strips, i.e., the fully elongate blanket strip 43, the mid-length strip 45, the partial strip 47 and the essentially filling strip 49 may also suitably be of ceramic fiber blanket strips and will virtually always be used in unfolded form, as shown in the figure. They are also separated one from the other in individual folds of the separate U-fold blankets 22, as shown in the figure. Usually, such strips will be of the same thickness dimension as for the thickness of one leg of a U-fold blanket, i.e., the thickness as shown in the FIG., although it will be understood that a different thickness for the strips can be serviceable and may be obtained by providing more than one filling strip in a single U-fold blanket 22. Owing to the variety in length of the filling strips to provide the generally trapezoidal-shape for the fiber bundle 15, it is preferred for economy and efficiency of manufacture of the fiber bundle 15 that such strips will not interlock. However, the blankets 22 themselves may have an interlocking configuration whereby the filling strips are merely inserted between folds, e.g., inserted in blanket seams at the bundle cold face, that are available from the interlocking configuration of the bundle blankets. For bundle uniformity, it is preferred that the filler strips extend well down into the blanket seam to be adjacent to the bend in the blanket, as shown in FIG. 3. It is also preferred that the filler strips have width dimension shorter than the width of the blankets 22, whereby they form a flush surface with the ends of the depending legs of the U-fold, also in the manner as shown in the figure.

In assembling the blankets for making a new cover, initially the outer packing blankets 9 can be pressed against the inner wall of the curved frame member 11. These blankets 9 may then be affixed to the foraminous metal sheet 12. Next, the fiber bundles 15 can be pressed up against the outer packing blankets 9, with the fasteners, e.g., bolts 17, poking through apertures in the foraminous metal sheet 12. Any packing blankets used between the fiber bundles 15 can be installed along with the bundles 15. These inter-bundle blankets can be merely held by compression between bundles 15. These fiber bundles 15 will then be secured to the foraminous metal sheet 12. Following this, the inner packing blankets 16 are forcefully abutted up against the inner face of the fiber bundles 15 and secured to the overhead metal sheet 12. Lastly, the main area blankets 13 are inserted and firmly pressed against the interior face of the inner packing blankets 16. These main area blankets 13 are then likewise affixed to the overhead metal sheet 12. Any overlay mats 10 that are used are generally present together with the metal sheet 12 before the other blankets are assembled in the cover i. Then in assembly the fasteners for the other blankets poke up through the overlay mats 10 and thus these mats 10 can be compressed by the other blankets up against the overhead metal sheet 12.

In installation, the fiber bundles 15 may De installed in the banded form as shown in FIG. 2. That is, the bands may be wrapped around the fiber bundles 15 to maintain them in extremely constricted configuration during installation. Following installation, these bands can be removed, thereby providing for the circumferential expansion of the fiber bundles 15 that, together with any inter-bundle packing blankets, provide for a snug fit and good seal at the joints where adjacent fiber bundles abut against one another. Although six-blanket bundles have been depicted in the figures, it will be understood that this is merely representative and that a greater or lesser number of blankets may be present in a bundle.

In repair, worn fiber bundles 15 may be readily removed by unfastening the bundles 15 from the foraminous metal sheet 12, e.g., unscrewing the nuts from the bolts 17. In this manner, the worn fiber bundles 15 can drop away from underneath the cover 1. Used inner packing blankets 16, as well as any outer packing blankets 9 and inter-bundle packing blankets, may also be removed. If used, these outer packing blankets 9 are then replaced and secured to the cover metal sheet 12. Thereafter, fresh fiber bundles 15 are pushed up from underneath the cover and secured to the overhead metal sheet 12. Fresh inter-bundle packing blankets may be similarly inserted in the cover 1. Usually these replacement bundles 15 will be substantially compressed, so that after securing the bundles 15 to the overhead metal sheet 12, the bands can be removed providing for circumferential expansion, and resulting side-by-side compression for adjacent bundles 15. Fresh inner packing blankets 16 can then be pushed between these fresh fiber bundles 15 and the retained main area blankets 13. These packing blankets 16 may be secured to the metal sheet 12, or they may be compression fit by packing between the bundles 15 and main area blankets 13. As will be thus understood, the cover may be desirably refurbished time and again by merely replacing worn fiber bundles 15 and associate packing blankets without disturbing the remainder of the insulation, particularly the main area blankets 13.

It is also contemplated that a combination overlay mat-packing blanket arrangement may be utilized. Thus, when an overlay mat 10 is employed, at least in the area of the inner packing blankets 16, the overlay mat 10 may be tucked down as a replacement for all or part of the inner packing blankets 16. For example, the overlay mat 10 can be draped downwardly forming a U-fold or the like that then forms the inner packing blanket 16. A somewhat similar structure can be employed by draping, usually into a U-fold, the outer most perimeter of an overlay mat 10 as a partial or a complete replacement for the outer packing blankets 9.

As will be appreciated such as by reference to FIG. 1, the individual blankets for the insulation are provided in different orientations. Both the outer and inner packing blankets 9 and 16 are arranged circumferentially. That is, they have their blanket lengths oriented in a manner that is concentric with the outer frame member 11. Then the individual blankets 22 in the fiber bundles 15 extend in length in a manner outwardly from the center of the cover towards the frame member 11. By this orientation, when they are installed in the cover, particularly in significantly compressed form, upon release from compression, these individual, radially extending blankets then as a group circumferentially expand for snug heat seal benefit. Within the central insulation area, occupied by the main area blankets 13, these blankets are oriented in a manner wherein their length is generally transverse across the central main area of insulation. For best circumferential expansion of the fiber bundles 15, it is preferred that the individual blankets 22 in these bundles 15 be oriented at least substantially as shown in FIG. 1. The long axis of the individual blankets 22 in the fiber bundle 15, relative to the long axis of the main area blankets 13 at the cut-away section of FIG. 1 is slightly angled. It will be understood that in one-quarter turns around the circumference of the cover, this relationship can vary from essentially parallel, i.e., be at 0°, to essentially perpendicular, i.e., be at 90°. It is also to be understood that the fiber bundles 15 need not extend completely around the perimeter of the cover, e.g., they may only be present in a portion of the perimeter where greatest insulation wear is expected.

Referring again to FIG. 1, it will be appreciated that the frame member 11 will typically be a rolled steel channel, but may be simply a steel plate, or a rolled plate or a rolled angle or the like, it being understood that other general cover configurations, e.g., octagonal, could be used. That is, the curved frame member 11 of the figure is only exemplary. The stiffening members 25 and 26 may also be of rolled plate or the like. The guide means 21 can be square shaped posts or rods and can project downwardly for any sufficient length that will augment guiding of the cover onto a container and will thereby otherwise support the cover, e.g., during resting of the cover, as on a floor. These guide means have been more particularly discussed in U.S. Pat. No. 4,606,473, which patent is incorporated herein by reference.

A variety of ceramic fiber insulation blanket structures may be employed. For example, blankets in addition to being U-fold or S-fold, can take other shapes, e.g., W-fold, or the more complex folded shapes, generally B-fold, such as disclosed in U.S. Pat. No. 4,829,734, and all said shapes are most always interlocked when possible. During assembly, fiber bundles 15 can be snugly pressed against the inner surface of the frame member 11 such that the outer packing blankets 9 need not be used. The foraminous metal sheet 12 to which the ceramic fiber insulation is secured is typically a sheet of expanded metal mesh, although other foraminous coverings are contemplated, e.g., a plate containing a multitude of holes. Moreover, whereas the invention has been referenced to the drawings as a "cover", it will be understood that such is only exemplary. Other structures, such as wall or door structures, may also serviceably employ the innovation as described herein.

Although elements of the insulation structure, other than the ceramic fiber insulation blankets and bundles, have been generally referred to herein as metal elements, it will be appreciated that for certain structures lightweight ceramic materials may be suitable. However, the structure is preferably free from such materials as well as from the usual tile and refractory materials, e.g., bricks and other ceramic materials, which are often found in heat insulating structures used in the metal heat treatment field. Furthermore, in addition to being tile-free and the like, the structure is usually mortar-free for best structural enhancement under a variety of insulation uses.

We claim:

1. In an insulation cover for retaining heat in a heated container, wherein the cover has a frame member sized at least substantially to an aperture of the container and contains ceramic fiber insulation within said frame member, which fiber insulation is secured to a foraminous member of said cover, the improvement comprising:

a main body of ceramic fiber insulation blankets situated in a transverse manner at least generally within the central area of said cover;

a plurality of ceramic fiber insulation bundles, prepared by binding together a group of fiber blankets, said bundles being situated around the perimeter of said cover and positioned in varying relationship to the transverse direction of said main body insulation; and a layer of ceramic fiber packing blankets in snug fit between said main body of ceramic fiber and said perimeter insulation bundles.

2. The insulation cover of claim 1, wherein the main body blanket have a long axis, the bundle blankets have a long axis, and the relationship of these axes for some bundles is at least essentially 0° and for some bundles is at least essentially 90°.

3. The insulation cover of claim 1, wherein the blankets of said ceramic fiber insulation bundles abut snugly against a layer of outermost ceramic fiber packing which is snug against an inner face of said frame member.

4. The insulation cover of claim 1, wherein adjacent ceramic fiber insulation bundles have a layer of inter-bundle ceramic fiber packing in snug fit between said bundles.

5. The insulation cover of claim 1, wherein said foraminous member is an expanded metal mesh.

6. In a wall-type insulation structure useful for retaining heat in a heat zone, wherein the structure has a frame member and contains ceramic fiber insulation within said frame member, which ceramic fiber insulation is secured to a foraminous sheet member of said system, the improvement comprising:

a main body of ceramic fiber insulation blankets situated in a transverse manner at least generally within the central area of said frame member;

a plurality of ceramic fiber insulation bundles, including units prepared from many ceramic fiber blankets, said bundles being situated within said frame member around the perimeter of said main body of insulation blankets and positioned in varying relationship to the transverse direction of said main body insulation; and a layer of ceramic fiber packing blankets in snug fit between said main body of ceramic fiber blankets and said perimeter insulation bundles.

7. The insulation structure of claim 6, wherein said main body of ceramic fiber insulation blankets are elongated blankets inserted in said structure in unbundled form.

8. The insulation structure of claim 6, wherein said ceramic fiber insulation bundles abut snugly against a second layer of ceramic fiber packing insulation which is snug against an inner face of said frame member.

9. The insulation structure of claim 6, wherein adjacent ceramic fiber insulation bundles have a layer of inter-bundle ceramic fiber packing in snug fit between said bundles.

10. The insulation structure of claim 6, wherein said main body blankets are all blankets of folded U-fold, S-fold, W-fold, or B-fold structure.

11. The insulation structure of claim 6, wherein said main body blankets, perimeter bundles and packing blankets are all secured to a foraminous sheet member comprising expanded metal mesh.

12. The insulation structure of claim 6, wherein said packing blankets are secured within said structure in compression fit.

13. In an insulation structure useful for retaining heat in a heat zone, which structure has a frame member and contains ceramic fiber insulation within said frame member, the improvement comprising:

a main body of elongated ceramic fiber insulation blankets situated in a transverse manner at least generally within the central area of said frame member;

a plurality of ceramic fiber insulation bundles comprising many individual blankets prepared in bundled form, said bundles being situated within said frame member around the perimeter of said main body insulation blankets, with there being at least some bundles having blankets positioned at least substantially perpendicular to the transverse direction of said main body blankets; and a layer of ceramic fiber packing blankets in snug fit between said main body blankets and said perimeter insulation bundles.

14. The insulation structure of claim 13, wherein said packing blankets are oriented at least substantially concentric to said frame member.

15. The insulation structure of claim 13, wherein the main body blanket have a long axis, the bundle blankets have a long axis, and the relationship of these axes for some bundles is at least essentially 0° and for some bundles is at least essentially 90°.

16. The insulation structure of claim 13, wherein adjacent ceramic fiber insulation bundles have a layer of inter-bundle ceramic fiber packing in snug fit between said bundles.

17. In an insulation structure useful for retaining heat in a heat zone, which structure has a frame member and contains ceramic fiber insulation within said frame member, the improvement comprising:

a main body of elongated ceramic fiber insulation blankets situated in a transverse manner at least generally within the central area of said frame member; and a plurality of ceramic fiber insulation bundles comprising many individual blankets prepared in bundled form, said bundles being situated within said frame member around the perimeter of said main body insulation blankets, with there being at least some bundles having blankets positioned at least substantially perpendicular to the transverse direction of said main body blankets wherein the main body blankets have a long axis, the bundle blankets have a long axis, and the relationship of these axes for some bundles is at least essentially 0° and for some bundles is at least essentially 90°.

18. The insulation structure of claim 17, wherein adjacent ceramic fiber insulation bundles have a layer of inter-bundle ceramic fiber packing in snug fit between said bundles.

* * * * *